S. W. BEACH.

Clamping Movable-Seats for Carriages.

No. 5,262. Reissued Jan. 28, 1873.

ATTEST:
H. Sprague
Thos. S. Day

INVENTOR:
Sylvester W. Beach
By Atty
Thos. S. Sprague

UNITED STATES PATENT OFFICE.

SYLVESTER W. BEACH, OF YPSILANTI, MICHIGAN, ASSIGNOR TO BEACH PATENT SHIFTING CARRIAGE-SEAT MANUFACTURING COMPANY.

IMPROVEMENT IN CLAMPING MOVABLE SEATS FOR CARRIAGES.

Specification forming part of Letters Patent No. 109,102, dated November 8, 1870; reissue No. 5,262, dated January 28, 1873.

*To all whom it may concern:*

Be it known that I, SYLVESTER W. BEACH, of Ypsilanti, in the county of Washtenaw and State of Michigan, have invented a new and useful Improvement in Clamping Movable Seats for Carriages; and I do declare that the following is a true and accurate description thereof, reference being had to the accompanying drawing and to the letters of reference marked thereon and being a part of this specification, in which—

Figure 1:
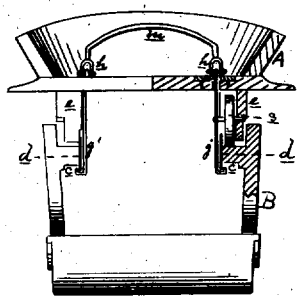
Figure 2:
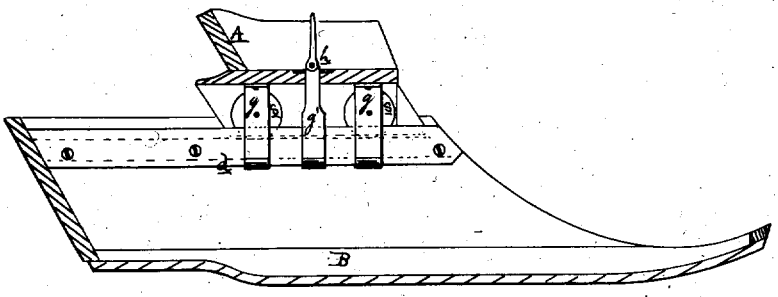
Figure 3:
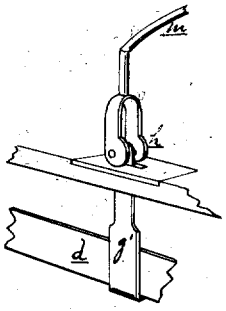

Figure 1 is a transverse section of half the carriage-seat, and a front view of the remaining half. Fig. 2 is a longitudinal section of the body and seat with the upper part of the body removed. Fig. 3 is an enlarged view of the guide *g'*, showing its engagement with the section of rail or plate, and the cam by means of which the guide is compelled to clasp the rail.

Like letters refer to like parts in each figure.

The nature of my invention consists in the devices employed for securing an adjustable carriage-seat in any desired position, substantially as hereinafter specified.

In the accompanying drawing, A represents the seat, and B the body, of the vehicle. *c c* are the two ways, firmly secured, to the inner sides of the body B near their upper edge. To the inner sides of the ways *c* are fastened the metallic plates *d*, said plates being made to extend above the ways for the purpose hereinafter described. *e e* represent two supports, to which the seat A is firmly secured. These supports or risers rest on the surface of the ways *c* and are kept in place by the rim of the carriage-body on the outer side, and the plates *d* on their inner side. To these supports or risers are securely fastened the metal guides *g*, two being attached to each support. These guides are hooked at their lower ends so as to embrace the lower edge of the plates *d*. Between each pair of these guides is a third guide, *g'*, the lower end of which is also hooked, to loo' ly engage with the lower edge of the plates *d*. Preferably, and in order to obtain a bearing for the cam *h*, the upper end of this guide is made to penetrate the bottom of the carriage-seat, where the end of the guides *g'* are pivoted to a cam, *h*, by means of which said guides *g'* are compelled to firmly grasp the plates *d* and hold the seat rigidly in place. Loosening the cam *h* enables the seat to be moved to and fro, as desired.

In order to prevent the necessity of loosening the two cams, one at each side of the body, by two separate motions, the cams *h* may be secured to each end of a bail, *m*.

The guides *g'* may have a vertical slot cut in them, said slots being penetrated by a bolt, which enters the supports *e* on each side of the seat, thereby allowing said guides to have a vertical motion, while at the same time they are secured to the supports.

I do not confine myself to this method of securing the guides *g'* to the supports, as other means may be adopted for the purpose.

To facilitate the moving the seat a small wheel, *s*, is pivoted to each of the fixed guides *g* and support *e*, thus producing a rolling instead of a rubbing friction.

In shifting the position of the seat all that will be required is to raise the cam-levers and loosen the clamping-guides *g'*; or where the cams are connected together by the bail *m* it is required to raise said bail to a vertical position, and the clamp-guides *g'* will loose their hold on the plates *d* so that the seat can be easily moved. By bringing the cam-levers on the bail down to a horizontal position the guides *g'* will clasp the plates *d*, and thus prevent the seat from moving.

What I claim as my invention, and desire to secure by Letters Patent, is—

1. The clamping-guides *g'*, operated by the cam *h*, substantially for the purposes set forth.

2. In connection with the clamping-guides *g'* and plate *d*, the cam *h*, for the purposes specified.

3. In connection with the clamping-guides *g'* and plate *d* and cam *h* the bail *m*, substantially as described, and for the purposes described.

4. The combination of the bail *m*, the clamping-guides *g'*, the ways *c*, the guides *g*, and the wheels *s*, when constructed and arranged substantially as and for the purposes set forth.

SYLVESTER W. BEACH.

Witnesses:
H. S. SPRAGUE,
THEO. S. DAY.